(12) United States Patent
Takamatsu et al.

(10) Patent No.: US 8,866,430 B2
(45) Date of Patent: Oct. 21, 2014

(54) APPARATUS FOR CONTROLLING BOOST CONVERTER (75) Inventors: Naoyoshi Takamatsu, Sunto-gun (JP); Masaki Okamura, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 138 days.

(21) Appl. No.: 13/698,230

(22) PCT Filed: Apr. 19, 2011

(86) PCT No.: PCT/JP2011/059652
§ 371 (c)(1),
(2), (4) Date: Nov. 15, 2012

(87) PCT Pub. No.: WO2012/144019
PCT Pub. Date: Oct. 26, 2012

(65) Prior Publication Data
US 2013/0057188 A1     Mar. 7, 2013

(51) Int. Cl.
*H02P 27/06* (2006.01)
*H02M 3/155* (2006.01)
*H02M 1/42* (2007.01)

(52) U.S. Cl.
CPC . *H02M 1/42* (2013.01); *Y02B 70/12* (2013.01)
USPC ............ 318/610; 318/621; 318/632; 318/455

(58) Field of Classification Search
USPC ......... 318/609, 610, 621, 622, 623, 629, 632, 318/434, 448, 452–455, 478, 479, 490
See application file for complete search history.

(56) References Cited

U.S. PATENT DOCUMENTS

| | | | |
|---|---|---|---|
| 6,914,420 B2* | 7/2005 | Crocker | 323/282 |
| 7,715,217 B2* | 5/2010 | Manabe et al. | 363/95 |
| 7,889,524 B2* | 2/2011 | Lee et al. | 363/65 |
| 2012/0068646 A1 | 3/2012 | Takamatsu et al. | |

FOREIGN PATENT DOCUMENTS

| | | |
|---|---|---|
| JP | 9-14265 A | 1/1997 |
| JP | 2004-112904 A | 4/2004 |
| JP | 2006-254518 A | 9/2006 |
| JP | 2010-200534 A | 9/2010 |
| WO | 2010/137128 A1 | 12/2010 |

* cited by examiner

*Primary Examiner* — Bentsu Ro
(74) *Attorney, Agent, or Firm* — Sughrue Mion, PLLC (57) ABSTRACT

An apparatus for controlling a boost converter is provided with: an operating device provided with a proportional element, an integral element and a derivative element, the derivative element being configured as a bandpass filter, the operating device calculating a PID controlled variable; a controlling device for controlling the output voltage of the boost converter on the basis of the calculated PID controlled variable; a judging device for judging whether or not loss suppression on the direct current power supply is to be prioritized; and a switching device for switching an operation mode of the operating device from a variation suppression mode to a loss suppression mode if it is judged that the loss suppression is to be prioritized. In the loss suppression mode, a cutoff frequency of the bandpass filter is corrected to a lower frequency side at a lower rotational speed of the three-phase alternating current motor.

5 Claims, 8 Drawing Sheets

APPARATUS FOR CONTROLLING BOOST CONVERTER

CROSS REFERENCE TO RELATED APPLICATIONS

This application is a National Stage of International Application No. PCT/JP2011/059652, filed on Apr. 19, 2011, the contents of all of which are incorporated herein by reference in their entirety.

TECHNICAL FIELD

The present invention relates to an apparatus for controlling a boost converter in a motor drive system for driving a three-phase alternating current (AC) motor.

BACKGROUND ART

In this type of technical field, an apparatus for reducing a voltage variation has been suggested (e.g. refer to a patent document 1). According to a voltage converting apparatus disclosed in the patent document 1, the voltage variation due to a dead time can be reduced by reducing a carrier frequency of the boost converter when a reactor current of the boost converter has a small absolute value.

PRIOR ART DOCUMENT

Patent Document

Patent document 1: Japanese Patent Application Laid Open No. 2004-112904

DISCLOSURE OF INVENTION

Subject to be Solved by the Invention

An inverter as an electric power converter disposed between the boost converter for boosting a direct current (DC) voltage supplied from a DC power supply and an electric load such as a motor is normally provided with a smoothing condenser for smoothing a voltage. The smoothing condenser becomes more difficult to produce a voltage variation and becomes more stable as its capacity increases. On the other hand, this large capacity increases its cost and body size. Therefore, in a situation in which there are not a few restrictions in an installation space and cost or the like such as in the drive control of a vehicle driving motor, reducing the capacity of the smoothing condenser tends to be desired.

On the other hand, if the capacity of the smoothing condenser is reduced, the terminal voltage of the smoothing condenser is likely subject to a voltage variation in a frequency band corresponding to a motor electrical frequency (roughly 0 to several hundred Hz). If switching elements and the like which constitute the inverter and the smoothing condenser are electrically protected from the voltage variation, their withstand voltages need to be increased; however, the increase in the withstand voltages is also generally associated with the increase in the cost and body size. Therefore, in reducing the capacity of the smoothing condenser, it is necessary to sufficiently suppress the voltage variation in the frequency band corresponding to the motor electrical frequency which occurs in the smoothing condenser.

Here, in order to suppress the voltage variation of the smoothing condenser, it is necessary to appropriately control the input/output current of the DC power supply. In the voltage converting apparatus disclosed in the patent document 1, a voltage control circuit of the smoothing converter is established as a PI control circuit which consists of a proportional element (P) and an integral element (I), and it cannot compensate for a phase delay of 90 degrees which occurs in the smoothing condenser. Thus, the voltage variation of the smoothing condenser cannot be suppressed in real time.

Here, in particular, it is considered that the voltage control circuit of the boost converter is established as a PID control circuit obtained by adding a derivative element (D) to the aforementioned constituents. Since the derivative element has a 90-degree phase lead characteristic, it is possible to preferably suppress the voltage variation in the frequency band corresponding to the motor electrical frequency, due to PID control realized by the PID control circuit.

However, regarding the derivative element, its control term (D term) generally increases as the frequency band increases. The voltage variation which occurs in the terminal voltage of the smoothing condenser is classified broadly into at least two categories; one is the voltage variation in the frequency band corresponding to the motor electrical frequency described above, and the other is a voltage variation (switching ripple) in a frequency band corresponding to a switching frequency (several k to several ten kHz) of the inverter. Therefore, the derivative element follows the switching ripple rather than the voltage variation in the frequency band corresponding to the motor electrical frequency. The frequency band of the switching ripple is in an area beyond the control speed of the input/output current of the DC power supply. If the derivative element follows the switching ripple as described above, it causes the terminal voltage of the smoothing condenser to be more unstable.

As described above, an apparatus established under the conventional technical idea, including the apparatus disclosed in the patent document 1, has such a technical problem that it is practically hard to reduce the capacity of the smoothing condenser.

Moreover, the voltage converting apparatus disclosed in the patent document 1 does not take into account power loss associated with the input/output of the electric power with respect to the DC power supply. Therefore, even if the voltage variation corresponding to the motor electrical frequency which occurs in the smoothing condenser can be suppressed, there can be also a case where practical benefits obtained by the suppression of the voltage variation are canceled, for example, by deteriorated fuel efficiency or the like due to the power loss. In reducing the capacity of the smoothing condenser, a balance with the power loss as described above also needs to be considered.

In view of the aforementioned problems, it is therefore an object of the present invention to provide an apparatus for controlling a boost converter, which can suppress its power loss as much as possible while it can reduce the capacity of a smoothing condenser in an electric power converter without an increase in withstand voltage, in a motor drive system provided with the electric power converter and the boost converter between a DC power supply and an electric load.

Means for Solving the Subject

The above object of the present invention can be achieved by an apparatus for controlling a boost converter in a motor drive system, the drive system provided with: a direct current power supply; a three-phase alternating current motor; an electric power converter disposed between the direct current power supply and the three-phase alternating current motor, the electric power converter including switching circuits, each of which corresponds to respective one of three phases of the three-phase alternating current motor, and a smoothing condenser, which is disposed electrically in parallel with the switching circuits; and the boost converter disposed between the electric power converter and the direct current power supply, the boost converter boosting a direct current voltage of the direct current power supply and supplying it to the electric power converter, the apparatus for controlling the boost converter provided with: an operating device comprising a proportional element, an integral element and a derivative element, the derivative element being configured as a bandpass filter, the operating device calculating a PID controlled variable corresponding to an electric current command value of the boost converter for maintaining an output voltage of the boost converter at a command value of an inter-terminal voltage VH of the smoothing condenser; a controlling device for controlling the output voltage of the boost converter on the basis of the calculated PID controlled variable; a judging device for judging whether or not suppress of loss associated with input/output of an electric power on the direct current power supply is to be prioritized over suppression of variation in the inter-terminal voltage VH; and a switching device for switching an operation mode when the operating device calculates the PID controlled value from a variation suppression mode in which a cutoff frequency of the bandpass filter is maintained at a reference value to a loss suppression mode in which the cutoff frequency is corrected to a reduction side with respect to the reference value if it is judged that the loss suppression is to be prioritized, in the loss suppression mode, the cutoff frequency being corrected to a lower frequency side at a lower rotational speed of the three-phase alternating current motor (claim 1).

The apparatus for controlling the boost converter of the present invention means, for example, a computer apparatus, a controller, a processor and the like provided with a memory or the like as occasion demands, and it can be provided with various electrical or magnetic elements and circuits, as occasion demands according to circumstances. Incidentally, the apparatus for controlling the boost converter may be an apparatus in which at least one portion thereof may be shared with a control apparatus for integrally controlling other elements which constitute the entire motor drive system of the present invention (e.g. the power electric converter and the three-phase alternating current (AC) motor).

According to the apparatus for controlling the boost converter of the present invention, by means of the operating device including the proportional element corresponding to a proportional term (P term), the integral element corresponding to an integral term (I term) and the derivative element corresponding to a derivative term (D term), the PID controlled variable is calculated as a controlled variable corresponding to the electric current command value of the boost converter for maintaining or converging the inter-terminal voltage VH of the smoothing condenser at or on the command vale (hereinafter expressed as a "VH command value" as occasion demands).

In other words, the boost converter is driven by PID control as a type of so-called feedback control, under the control of the controlling device of the present invention. Incidentally, a deviation used in carrying out the feedback control is preferably a deviation between the VH command value as a control target, determined in accordance with a target torque and a target rotational speed of the three-phase AC motor, and the inter-terminal voltage VH at that time point.

Incidentally, the apparatus for controlling the boost converter of the present invention may be preferably provided with another operating device for calculating a controlled variable (e.g. a PI controlled variable which consist of the P term and the I term) for maintaining an electric current value of the boost converter at the electric current command value, as a duty signal or the like to be used for a comparison with a carrier signal, on the basis of a deviation between the electric current command value as the PID controlled variable obtained by the controlled variable operation according to this PID control rule and the electric current value of the boost converter at that time point.

Here, the derivative element has a 90-degree phase lead characteristic and it is preferable as an element for compensating for a phase delay of 90 degrees which occurs in the smoothing condenser. In other words, due to the derivative term obtained by the derivative element, it is possible to match the phase of a direct current (DC) carried from the DC power supply in the course of the feedback control and the phase of the electric power of the three-phase AC motor, and it is preferably possible to suppress the voltage variation corresponding to the motor electrical frequency which occurs in the output voltage (inter-terminal voltage VH) of the boost converter. Namely, by virtue of such a technical idea that the PID control is used to control the boost converter, it is not necessary to increase the withstand voltage required for the switching elements of the electric power converter and the smoothing condenser in association with the reduction in the capacity of the smoothing condenser. Moreover, it is also possible to reduce the capacity of the smoothing condenser without an increase in its cost and body size.

By the way, since a differentiator reacts more sensitively on a higher frequency side, the controlled variable (D term) is influenced more significantly by the switching ripple of the electric power converter, which varies in a higher frequency side of band than the motor electrical frequency (generally whose orders are different by about single digit to double digits). This results in a reduction in the effect of suppressing the voltage variation corresponding to the motor electrical frequency desirably to be suppressed. In addition, the switching ripple of the electric power converter cannot be followed. Thus, it more likely varies the inter-terminal voltage VH of the smoothing condenser.

Thus, in the operating device of the present invention, the derivative element is configured not as the normal differentiator but the bandpass filter (BPF). The BPF is a device for passing signals in a certain degree of frequency band (which can be variable depending on its design) centered on a cutoff frequency fc, or a device for amplifying signals in accordance with a gain set as occasion demands and passing the signals.

The adoption of the BPF is derived from the discovery of practically useful facts, which are shown in the following (1) to (3), in the course that the inventors of this application further study the technical field.

(1) The BPF has a 90-degree phase lead characteristic (specifically, the phase leads more, up to 90 degrees, as the frequency decreases) which is substantially equivalent to that of the differentiator, in one portion of a low frequency band on the lower frequency side than the cutoff frequency.

(2) In a high frequency band on the higher frequency side than the cutoff frequency fc, the phase lead characteristic described in (1) is lost, and pass signal intensity also attenuates.

(3) As an alternate element of the differentiator, if the BPF is used as the derivative element, it is possible to efficiently suppress only the voltage variation corresponding to the motor electrical frequency, depending on the design of the cutoff frequency fc. This is derived from the aforementioned (1) and (2) and the significant difference between the frequency band to which the motor electrical frequency for defining the frequency characteristics of the voltage variation desirably to be suppressed belongs and the frequency band to which the switching ripple of the electric power converter desirably not to be followed belongs.

As described above, according to the apparatus for controlling the boost converter of the present invention, since the derivative element for calculating the derivative term on the operating device is the BPF, the voltage variation corresponding to the motor electrical frequency can be suppressed, and excessive reaction to the switching ripple of the electric power converter can be also suppressed. As a result, it is possible to stably maintain the inter-terminal voltage VH of the smoothing condenser, thereby realizing the reduction in the capacity of the smoothing condenser without an increase in its cost and body size.

Incidentally, as described above, in order to enable the BPF to effectively function as the derivative element, it is important to design or set the cutoff frequency fc. In terms of the comparison with the differentiator, the setting band of the cutoff frequency fc, which can be clearly superior in efficacy in practice to the differentiator, is broad enough not to require numerical limitation.

However, as a preferred form, the cutoff frequency of the BPF may be set within any of the bands shown in the following (1) to (3).

(1) A band between the physical upper limit of the motor electrical frequency and the physical lower limit of the switching frequency of the electric power converter (which is a relatively broad band as described above).

(2) A band in which a sufficient phase lead amount (e.g. a phase lead amount of "90 degrees–$\alpha$" or more) is ensured with respect to a desired motor electrical frequency to be suppressed for sure.

(3) A band in which a sufficient pass signal amount (e.g. a pass signal amount of "0–$\beta$" dB or more) is ensured with respect to the desired motor electrical frequency to be suppressed for sure.

Here, it is desirable that the voltage variation corresponding to the motor electrical frequency in the smoothing condenser is ideally suppressed independently of the extent of its level from the viewpoint of reducing the capacity of the smoothing condenser.

However, a measure to suppress the voltage variation by the PID control in the present invention is to compensate for the voltage variation conventionally absorbed by the capacity of the smoothing condenser by making an electric current pulsate on the DC power supply in association with the reduction in the capacity of the smoothing condenser, and it is a measure inevitably accompanied by the power loss on the DC power supply.

Therefore, if the measure to suppress the voltage variation by the PID control is unlimitedly taken, there is a worry that the power loss of the DC power supply, which occurs to suppress the voltage variation which is relatively minor enough not to exceed the withstand voltage (i.e. originally, less necessary for the suppression) of the switching elements or the like of the smoothing condenser or the electric power converter, is actualized, for example, as deterioration of a fuel efficiency upon installation in the vehicle or the like.

Thus, the apparatus for controlling the boost converter of the present invention is provided with the judging device and the switching device, in order to suppress the power loss associated with the input/output of the electric power on the DC power supply. In other words, on the apparatus for controlling the boost converter of the present invention, the judging device judges whether or not the suppress of the loss associated with the input/output of the electric power on the DC power supply is to be prioritized over the suppression of the variation in the inter-terminal voltage of the smoothing condenser, and the switching device switches the operation mode associated with the calculation of the PID controlled value by the operating device from the variation suppression mode to the loss suppression mode if it is judged that the loss suppression is to be prioritized. In other words, the operating device of the present invention has at least two types of operation modes, which are the variation suppression mode in which the voltage variation suppression is prioritized and the loss suppression mode in which the loss suppression is prioritized, as the operation mode associated with the calculation of the PID controlled value. By selectively switching the operation mode to one operation mode corresponding to a situation to be prioritized, the suppression of the voltage variation and the reduction in the power loss are cooperatively realized.

At this time, in the loss suppression mode, the cutoff frequency of the bandpass filter of the operating device is corrected to a low frequency side in comparison with the variation suppression mode. In particular, as the rotational speed of the three-phase AC motor decreases, the cutoff frequency is corrected to the lower frequency side.

The judgment of the priority on the judging device can be accompanied by various practical aspects. For example, the judging device may continuously monitor the inter-terminal voltage VH of the smoothing condenser with a certain or uncertain period and may use its variation level (e.g. a difference between the maximum value and the minimum value or the like) as a reference element for the priority judgment. In this case, a criterion for weighting between the variation level and the power loss may be given in advance or may be obtained individually and specifically at each time. Alternatively, the judging device may sequentially perform this type of priority judgment on the basis of conditions of various constituents of the motor drive system or the like in which it is determined experimentally, experientially, or theoretically in advance that it corresponds to the degree of the voltage variation in one-to-one, one-to-many, many-to-one, or many-to-many manner.

On the other hand, in a situation in which the power loss suppression on the DC power supply is to be prioritized, the cutoff frequency of the bandpass filter is reduced and corrected by the correcting device in a binary, stepwise or continuous manner in comparison with the normal case, in accordance with the rotational speed of the three-phase AC motor. If the cutoff frequency is corrected to the low frequency side, a band in which a phase lead amount of about 90 degrees (i.e. a band in which the bandpass filter functions well as the derivative element) decreases, and a frequency band having less signal attenuation also decreases. This reduces the following capability of the output current waveform of the boost converter with respect to the voltage variation corresponding to the motor electrical frequency on the smoothing condenser. In other words, the current pulsation on the DC power supply becomes slower, and the power loss can be relatively reduced by that much.

In one aspect of the apparatus for controlling the boost converter of the present invention, the boost converter includes: a reactor whose one end is connected to a positive electrode of the direct current power supply; a first switching element connected between the other end of the reactor and the electric power converter; a second switching element connected between the other end of the reactor and a negative electrode of the direct current power supply; and first and second diodes connected to the first and second switching elements in inverse parallel, respectively (claim 2).

If the boost converter is configured in this manner, then, due to the control of switching states of the first and second switching elements, it is possible to control the output voltage of the boost converter which is equivalent to the inter-terminal voltage VH of the smoothing condenser, with relatively good controllability. Therefore, it is possible to preferably suppress the voltage variation corresponding to the motor electrical frequency which occurs in the inter-terminal voltage VH of the smoothing condenser.

Incidentally, in the configuration of the boost converter as described above, the electric current command value of the boost converter is a command value (target value) of a reactor current flowing in the reactor.

In another aspect of the apparatus for controlling the boost converter of the present invention, the judging device judges whether or not the loss suppression is to be prioritized on the basis of a variation level of the inter-terminal voltage VH (claim 3).

According to this aspect, since it is judged whether or not the loss suppression is to be prioritized on the basis of the actual variation level of the inter-terminal voltage VH, the judgment of which is to be prioritized can be performed highly accurately.

In another aspect of the apparatus for controlling the boost converter of the present invention, the judging device judges whether or not the loss suppression is to be prioritized on the basis of a drive condition of the three-phase alternating current motor (claim 4).

According to this aspect, since it is judged whether or not the loss suppression is to be prioritized on the basis of the drive condition of the three-phase AC motor (e.g. a torque, a rotational speed, or both), the judging device can perform the judgment, relatively easily.

Incidentally, in this aspect, the judging device may judge that the loss suppression is to be prioritized if a torque value of the three-phase alternating current motor is less than a reference value which changes to be low and high in accordance with a high and low rotational speed of the three-phase alternating current motor, respectively (claim 5).

The voltage variation of the motor electrical frequency on the smoothing condenser depends on the motor electrical frequency if looking at only its frequency characteristic; however, the variation range is also influenced by a torque value. In other words, in accordance with a combination of the torque and the rotational speed, it is possible to judge whether or not the voltage variation is to be suppressed. Here, from the viewpoint of one torque value, as an overall tendency, the extent of the voltage variation increases as the motor electrical frequency increases. From the viewpoint of one rotational speed, as an overall tendency, the extent of the voltage variation increases as the torque value increases. Therefore, as described above, regarding the torque value, by setting the reference value which changes to be low and high in a binary, stepwise or continuous manner in accordance with the high and low rotational speed of the motor, it is possible to judge whether or not the power loss suppression is to be prioritized, more accurately.

The operation and other advantages of the present invention will become more apparent from embodiments explained below.

MODE FOR CARRYING OUT THE INVENTION

<Embodiments of the Invention>

Hereinafter, various preferred embodiments of the present invention will be explained with reference to the drawings.

<First Embodiment>
<Configuration of Embodiment>

Figure 1:
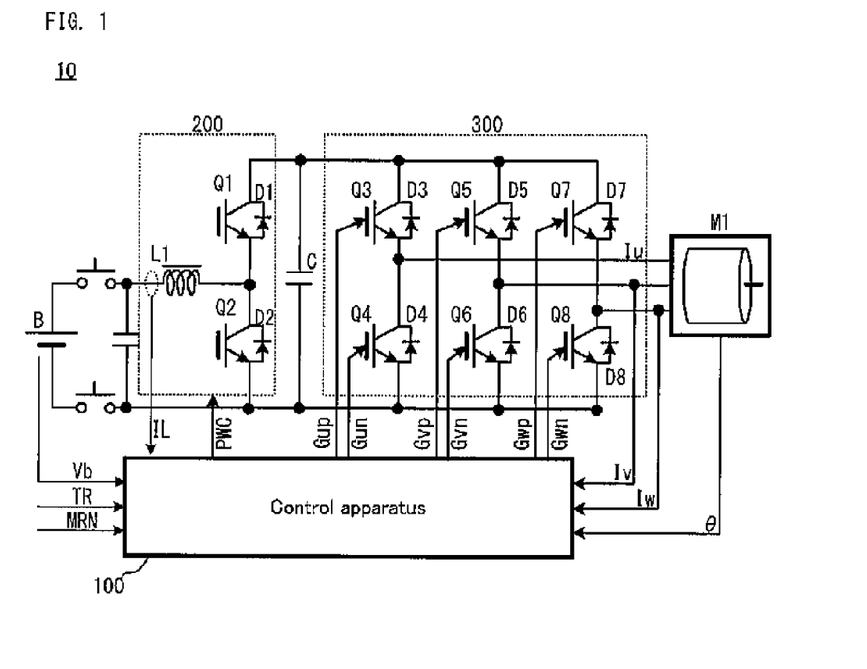
FIG. 1 is a system configuration diagram showing a motor drive system in a first embodiment of the present invention.

Firstly, with reference to FIG. 1, an explanation will be given on the configuration of a motor drive system 10 in the embodiment. FIG. 1 is a system configuration diagram conceptually showing the configuration of the motor drive system 10.

In FIG. 1, the motor drive system 10 is provided with a control apparatus 100, a boost converter 200, an inverter 300, a smoothing condenser C, a direct current (DC) power supply B, and a three-phase alternating current (AC) motor M1.

The control apparatus 100 is configured to control the operations of the motor drive system 10, and it is an electronic control unit as one example of the "apparatus for controlling the boost converter" of the present invention. The control apparatus 100 can adopt forms of various computer systems such as various processing units like a single or a plurality of Electronic Control Units (ECUs) or the like, various controllers or microcomputer apparatuses, which can include one or a plurality of Central Processing Units (CPUs), Micro Processing Units (MPUs), various processors or various controllers, or various memory devices such as a Read Only Memory (ROM), a Random Access Memory (RAM), a buffer memory or a flush memory, as occasion demands. The control apparatus 100 is provided with a boost converter controller 110 and an inverter controller 120, which are not illustrated in FIG. 1. The configuration of each controller will be described later.

Incidentally, the control apparatus 100 can perform a mode switching control process in accordance with a control program stored in a ROM. The mode switching control process will be described later.

The boost converter 200 is provided with a reactor L1, switching elements Q1 and Q2, and diodes D1 and D2, and it is one example of the "boost converter" of the present invention.

One end of the reactor L1 is connected to a positive electrode wire (whose reference numeral is omitted) connected to a positive electrode of the DC power supply B, and the other end is connected to a midway point between the switching element Q1 and the switching element Q2, i.e. a connection point between an emitter terminal of the switching Q1 and a collector terminal of the switching Q2.

The switching elements Q1 and Q2 are connected in series between the positive electrode wire and a negative electrode wire (whose reference numeral is omitted) connected to a negative electrode of the DC power supply B. Moreover, the collector terminal of the switching Q1 is connected to the positive electrode wire, and the emitter terminal of the switching Q2 is connected to the negative electrode wire. The switching elements Q1 and Q2 are one example of the "first switching element" and the "second switching element" of the present invention, respectively. The diodes D1 and D2 are rectifiers for permitting only an electric current flowing from the emitter side to the collector side on the respective switching elements. The diodes D1 and D2 are one example of the "first diode" and the "second diode" of the present invention, respectively. The switching elements Q1 and Q2 and each of switching elements (Q3 to Q8) of the inverter 300 described later are configured, for example, as Insulated Gate Bipolar Transistors (IGBT), power Metal Oxide Semiconductor (MOS) transistors, or the like.

The inverter 300 is provided with: a U-phase arm (whose reference numeral is omitted) including a p-side switching element Q5 and an n-side switching Q6; a V-phase arm (whose reference numeral is omitted) including a p-side switching element Q3 and an n-side switching Q4; and a W-phase arm (whose reference numeral is omitted) including a p-side switching element Q7 and an n-side switching Q8. The inverter 300 is one example of the "electric power converter" of the present invention. The arms of the inverter 300 are connected in parallel between the positive electrode wire and the negative electrode wire. To the switching elements Q3 to Q8, as in the switching elements Q1 and Q2, rectifying diodes D3 to D8 for passing an electric current from the emitter side to the collector side are connected, respectively. Moreover, a midway point between the p-side switching element and the n-side switching element in each phase arm of the inverter 300 is connected to respective one phase coil of the three-phase AC motor M1.

The smoothing condenser C is a condenser for smoothing a voltage which is connected between the positive electrode wire and the negative electrode wire, and it is one example of the "smoothing condenser" of the present invention. The inter-terminal voltage of the smoothing condenser, i.e. the voltage between the positive electrode wire and the negative electrode wire, is one example of the "inter-terminal voltage VH" of the present invention.

The DC power supply B is a chargeable electric storage apparatus, and it is, for example, various secondary batteries such as a nickel-metal hydride battery and a lithium ion battery. Incidentally, as the DC power supply B, in addition to or instead of this type of secondary battery, an electric double layer capacitor, a large-capacity condenser, a flywheel, and the like may be used.

The three-phase AC motor M1 is a three-phase AC motor generator in which a permanent magnet is buried in a rotor. The three-phase AC motor M1 is mechanically connected to a not-illustrated driving wheel of a vehicle, and it is configured to generate a torque for driving the vehicle. The three-phase AC motor M1 can also perform electric power regeneration (power generation) in response to vehicular kinetic energy in braking the vehicular. If this vehicle is a so-called hybrid vehicle, the three-phase AC motor M1 is mechanically coupled with a not-illustrated engine and it can perform the electric power regeneration by using the power of the engine and assist the power of the engine.

In the motor drive system 10, a not-illustrated sensor group is attached so as to detect a voltage Vb of the DC power supply B, a reactor current IL flowing in the reactor L1 of the boost converter 200 (namely equivalent to a battery current Ib as the input/output current of the DC power supply B), an inter-terminal voltage VH of the smoothing condenser C, a v-phase current Iv and a w-phase current Iw of the inverter 300, a motor rotational phase θ, and the like. Each of sensors which constitute the sensor group is electrically connected to the control apparatus 100, and detected values are recognized in real time by the control apparatus 100.

In the motor drive system 10, the boost converter 200 and the inverter 300 are electrically connected to the control apparatus 100, and their drive states are controlled by the control apparatus 100.

Here, in particular, the boost converter 200 can boost the voltage between the positive electrode wire and the negative electrode wire, i.e. the inter-terminal voltage VH, to the output voltage of the DC power supply B or more, on the basis of a signal PWC supplied from the control apparatus 100. At this time, if the inter-terminal voltage VH is less than a VH command value as a target voltage, the on-duty of the switching element Q2 is set to be relatively large, which makes it possible to increase the electric current flowing in the positive electrode wire from the DC power supply B side to the inverter 300 side and to increase the inter-terminal voltage VH. On the other hand, if the inter-terminal voltage VH is greater than the VH command value, the on-duty of the switching element Q1 is set to be relatively large, which makes it possible to increase the electric current flowing in the positive electrode wire from the inverter 300 side to the DC power supply B side and to reduce the inter-terminal voltage VH.

Figure 2:
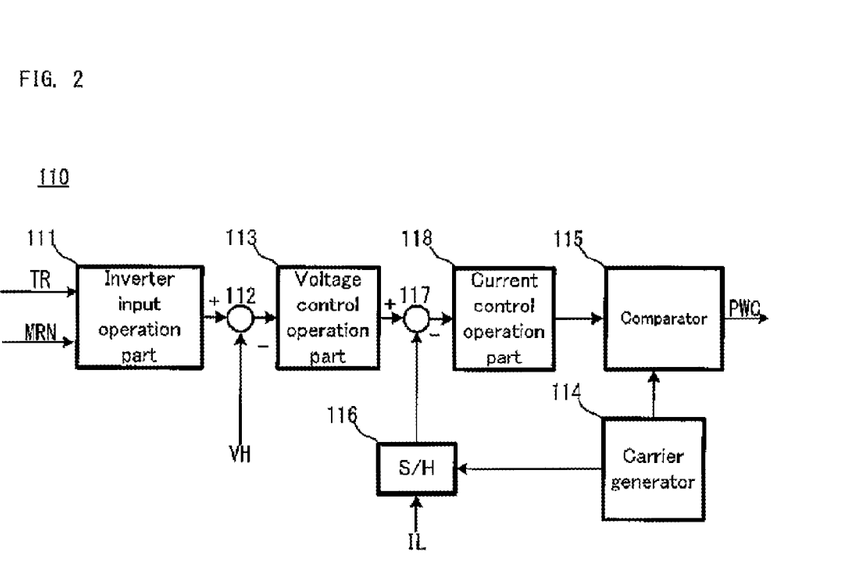
FIG. 2 is a block diagram showing a boost converter controller in a control apparatus provided for the motor drive system in FIG. 1.

Now, with reference to FIG. 2, an explanation will be given on the configuration of the boost converter controller 110 for controlling the boost converter 200 on the control apparatus 100. FIG. 2 is a block diagram showing the boost converter controller 100. Incidentally, in FIG. 2, portions overlapping those of FIG. 1 will carry the same reference numerals, and the explanation thereof will be omitted as occasion demands. Incidentally, in the explanation with reference to FIG. 2 and subsequent FIG. 3, FIG. 4, and FIG. 5, the operations of the embodiment will be also explained in conjunction with the configuration of the embodiment.

In FIG. 2, the boost converter controller 110 is provided with an inverter input operation part 111, an adder-subtractor 112, a voltage control operation part 113, a carrier generator 114, a comparator 115, a sample hold (S/H) circuit 116, an adder-subtractor 117, and a current control operation part 118. The boost converter controller 110 is one example of the "apparatus for controlling the boost converter" of the present invention.

The inverter input operation part 111 is a circuit for generating a VH command value VHtg indicating the target value of the inter-terminal voltage VH, which is the output voltage of the boost converter 200. For example, the inverter input operation part 111 generates the VH command value VHtg on the basis of the output value of the three-phase AC motor M1 calculated from a motor rotational speed MRN and a torque command value TR of the three-phase AC motor M1.

The adder-subtractor 112 subtracts the detected value of the inter-terminal voltage VH from the VH command value VHtg and outputs the subtraction result (VH deviation) to the voltage control operation part 113.

When receiving the VH deviation as the subtraction result obtained by subtracting the detected value of the inter-terminal voltage VH from the VH command value VHtg, the voltage control operation part 113 calculates an electric current command value IR for matching the inter-terminal voltage VH with the VH command value VHtg on the basis of the VH deviation. The voltage control operation part 113 transmits the calculated electric current command value IR to the adder-subtractor 117. Incidentally, the configuration and operations of the voltage control operation part 113 will be described later.

The carrier generator 114 is a circuit for generating a carrier Car which is a triangular wave having a carrier frequency fcar. The generated carrier Car is transmitted to the comparator 115 and the S/H circuit 116.

The S/H circuit 116 samples and holds the reactor current IL in each timing of the peak and valley (bottom) of the waveform of the carrier Car received from the carrier generator 114.

The adder-subtractor 117 subtracts the detected value of the reactor current IL sampled and held by the S/H circuit 116, from the electric current command value IR transmitted from the voltage control operation part 113. A current deviation as the subtraction result is transmitted to the current control operation part 118.

The current control operation part 118 calculates a controlled variable for matching the reactor current IL with the electric current command value IR on the basis of the current deviation transmitted from the adder-subtractor 117. The current control operation part 118 outputs the calculated controlled variable to the comparator 115 as a duty command value d. Incidentally, the configuration and operations of the current control operation part 118 will be described later.

The comparator 115 compares the magnitude relation of the duty command value d and a carrier signal and generates the aforementioned signal PWC whose logical state varies depending on the magnitude relation. The generated signal PWC is outputted to the switching elements Q1 and Q2 of the boost converter 200 so as to drive each switching element.

Figure 3:
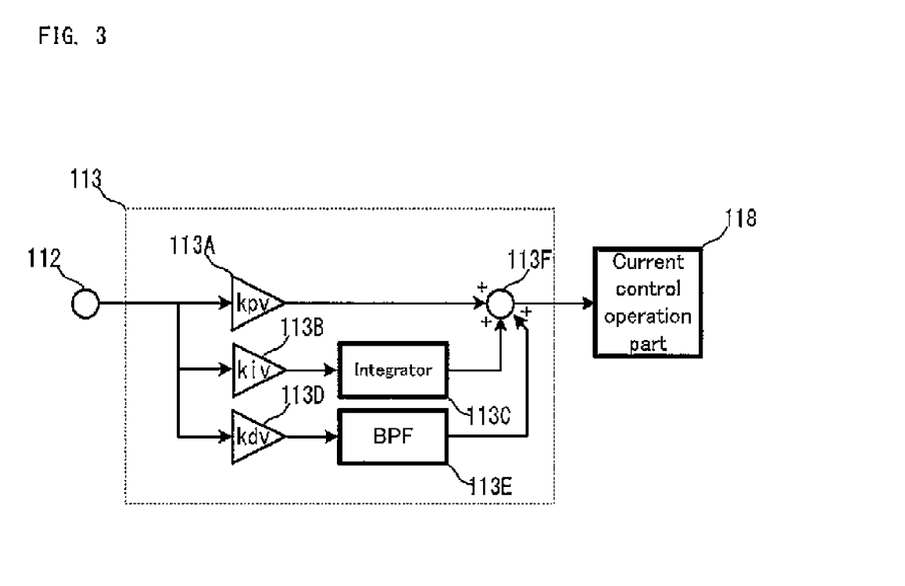
FIG. 3 is a block diagram showing a voltage control operation part in the boost converter controller in FIG. 2.

Next, with reference to FIG. 3, an explanation will be given on the detailed configuration of the voltage control operation part 113 in the boost converter controller exemplified in FIG. 2. FIG. 3 is a block diagram showing the voltage control operation part 113. Incidentally, in FIG. 3, portions overlapping those of FIG. 2 will carry the same reference numerals, and the explanation thereof will be omitted as occasion demands.

In FIG. 3, the voltage control operation part 113 is provided with: a proportional element including an amplifier 113A; an integral element including an amplifier 113B and an integrator 113C; a derivative element including an amplifier 113D and a BPF 113E; and an adder 113F, and it is a processor as one example of the "operating device" of the present invention. On the voltage control operation part 113, a proportional term (P term), an integral term (I term) and a derivative term (D term) are calculated by the respective elements, and the calculated respective control terms are added by the adder 113F. In the end, a PID controlled variable corresponding to the electric current command value IR described above is calculated.

The amplifier 113A is an amplifier associated with the operation of the P term out of the PID controlled variable, and it is configured to amplify the aforementioned VH deviation outputted from the adder-subtractor 112 in accordance with a predetermined proportional gain pv and to transmit it to the adder 113F.

The amplifier 113B is an amplifier associated with the operation of the I term out of the PID controlled variable, and it is configured to amplify the aforementioned VH deviation outputted from the adder-subtractor 112 in accordance with a predetermined integral gain kiv and to transmit it to the integrator 113C. On the integrator 113C, the VH deviation multiplied by the integral gain kiv, which is transmitted from the amplifier 113B, is integrated and then transmitted to the adder 113F.

The amplifier 113C is an amplifier associated with the operation of the D term out of the PID controlled variable, and it is configured to amplify the aforementioned VH deviation outputted from the adder-subtractor 112 in accordance with a predetermined derivative gain kdv and to transmit it to the BPF 113. On the BPF 113E, the VH deviation multiplied by the derivative gain kdv, which is transmitted from the amplifier 113C, is transmitted through the BPF 113E in accordance with its bandpass characteristic and then transmitted to the adder 113F.

On the adder 113F, the respective PID controlled variables of the P term, the I term and the D term supplied from the amplifier 113A, the integrator 113C and the BPF 113E, respectively, are added and outputted to the adder-subtractor 117 as the electric current command value IR, which is the output value of the voltage control operation part 113. The voltage control operation part 113 is configured as described above.

Figure 4:
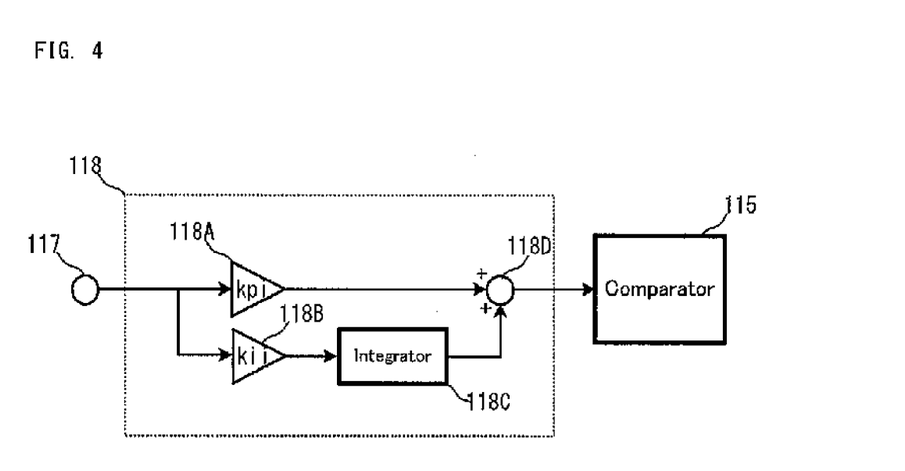
FIG. 4 is a block diagram showing a current control operation part in the boost converter controller in FIG. 2.

Next, with reference to FIG. 4, an explanation will be given on the detailed configuration of the current control operation part 118 in the boost converter controller exemplified in FIG. 2. FIG. 4 is a block diagram showing the current control operation part 118. Incidentally, in FIG. 4, portions overlapping those of FIG. 2 will carry the same reference numerals, and the explanation thereof will be omitted as occasion demands.

In FIG. 4, the current control operation part 118 is a processor provided with: a proportional element including an amplifier 118A; an integral element including an amplifier 118B and an integrator 118C; and an adder 118D. On the current control operation part 118, a proportional term (P term) and an integral term (I term) are calculated by the respective elements, and the calculated respective control terms are added by the adder 118D. In the end, a PI controlled variable corresponding to the duty d described above is calculated.

The amplifier 118A is an amplifier associated with the operation of the P term out of the PI controlled variable, and it is configured to amplify the aforementioned current deviation outputted from the adder-subtractor 117 in accordance with a predetermined proportional gain pi and to transmit it to the adder 118D.

The amplifier 118B is an amplifier associated with the operation of the I term out of the PI controlled variable, and it is configured to amplify the aforementioned current deviation outputted from the adder-subtractor 117 in accordance with a predetermined integral gain kii and to transmit it to the integrator 118C. On the integrator 118C, the current deviation multiplied by the integral gain kii, which is transmitted from the amplifier 118B, is integrated and then transmitted to the adder 118D.

Figure 5:
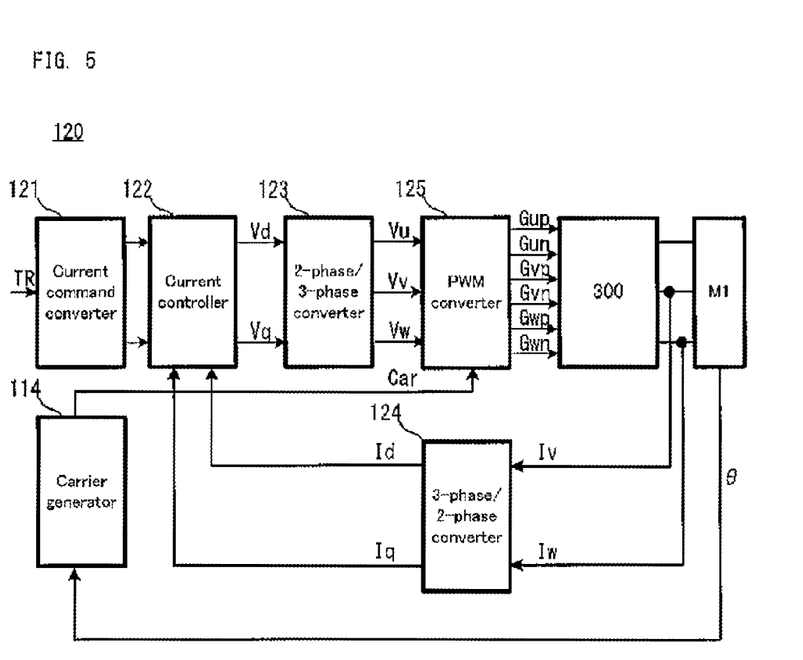
FIG. 5 is a block diagram showing an inverter controller in the control apparatus provided for the motor drive system in FIG. 1.

Next, with reference to FIG. 5, the configuration of the inverter controller 120 will be explained. FIG. 5 is a block diagram showing the inverter controller 120. Incidentally, in FIG. 5, portions overlapping those of the already-described figures will carry the same reference numerals, and the explanation thereof will be omitted as occasion demands.

In FIG. 5, the inverter controller 120 is provided with a current command converter 121, a current controller 122, a 2-phase/3-phase converter 123, a 3-phase/2-phase converter 124, a carrier generator 114 (shared with the boost converter controller 110), and a PWM converter 125.

The current command converter 121 generates 2-phase electric current command values (Idtg, Iqtg) on the basis of the torque command value TR of the three-phase AC motor M1.

On the other hand, from the inverter 300, the v-phase current Iv and the w-phase current Iw are supplied to the 3-phase/2-phase converter 124 as feedback information. On the 3-phase/2-phase converter 124, three-phase electric current values are converted to two-phase electric current values which consist of a d-axis current Id and a q-axis current Iq, on the basis of the v-phase current Iv and the w-phase current Iw. The two-phase electric current values after the conversion are transmitted to the current controller 122.

On the current controller 122, on the basis of a difference between the two-phase electric current command values generated on the current command converter 121 and the two-phase electric current values Id and Iq received from the 3-phase/2-phase converter 124, two-phase voltage command values which consist of a d-axis voltage Vd and a q-axis voltage Vq are generated. The generated two-phase voltage command values Vd and Vq are transmitted to the 2-phase/3-phase converter 123.

On the 2-phase/3-phase converter 123, the two-phase voltage command values Vd and Vq are converted to three-phase voltage command values Vu, Vv and Vw. The converted three-phase voltage command values Vu, Vv and Vw are transmitted to the PWM converter 125.

Here, the PWM converter 125 is configured to receive the carrier Car having the predetermined carrier frequency fear from the carrier generator 114. The PWM converter 125 compares the magnitude relation of the converted three-phase voltage command values Vu, Vv and Vw, generates u-phase switching signals Gup and Gun, v-phase switching signals Gyp and Gvn, and w-phase switching signals Gwp and Gwn, whose logical states change depending on the comparison result, and supply them to the inverter 300.

More specifically, of the switching signals corresponding to each phase, the signal with an identifier of "p" means a drive signal for driving the p-side switching element (Q3, Q5 and Q7) out of the switching elements for each phase, and the signal with an identifier of "n" means a drive signal for driving the n-side switching element (Q4, Q6 and Q8) out of the switching elements for each phase.

Here, in particular, in the comparison of the carrier Car and the voltage command value for each phase, if the voltage command value for each phase matches the carrier Car from a value that is less than the carrier Car, the switching signal for turning on the p-side switching element is generated. Moreover, if the voltage command value for each phase matches the carrier Car from a value that is greater than the carrier Car, the switching signal for turning on the n-side switching element is generated. In other words, in the switching signals, their on and off are inextricably linked to each other, and always either one of the p-side and n-side switching elements for each phase is in the on state and the other is in the off state.

If the inverter 300 is changed to or maintained in the drive state of each of the switching elements defined by the switching signals for each phase, the three-phase AC motor M1 is driven in accordance with a circuit state corresponding to the drive state changed or maintained. Incidentally, such a control aspect of the inverter 300 is one aspect of the so-called PWM control.

<Effect of PID Control of Voltage Control Operation Part 113>

Figure 6:
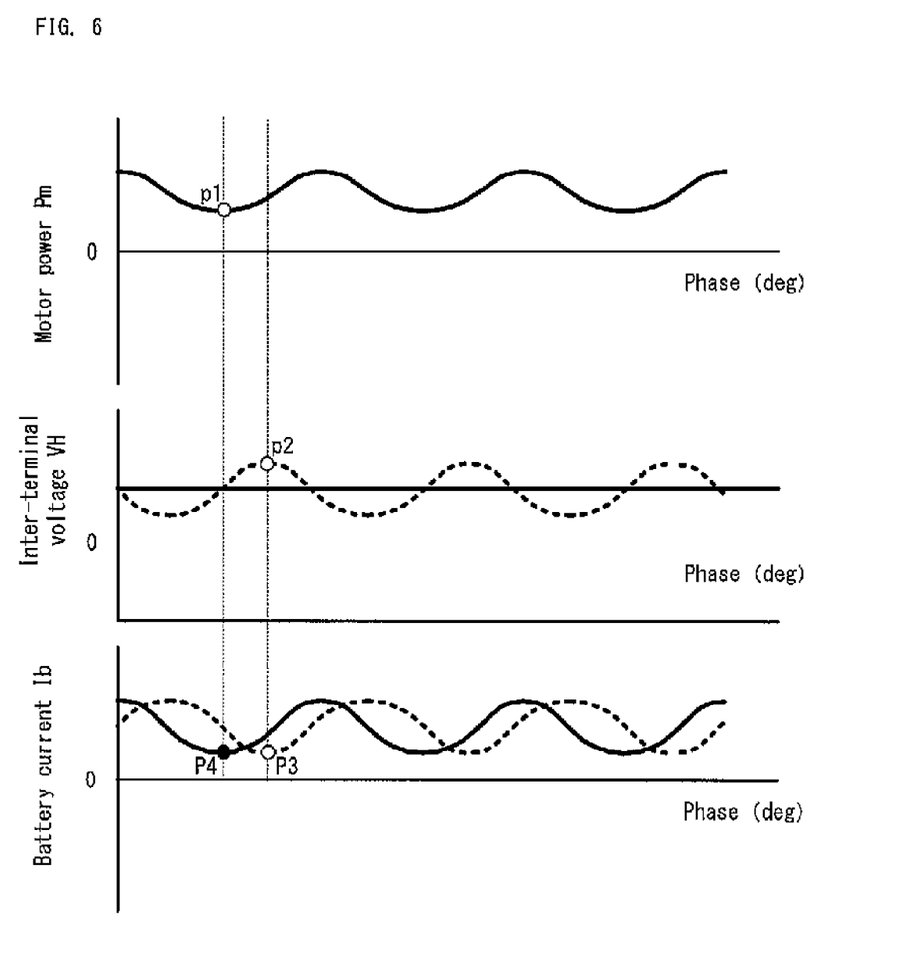
FIG. 6 is a view exemplifying a phase relation among a motor electric power, an inter-terminal voltage and a battery current, associated with the effect of the control apparatus provided for the motor drive system in FIG. 1.

Next, with reference to FIG. 6, as the effect of the embodiment, the effect of the PID control will be explained. FIG. 6 is a view explaining a phase relation among a motor electric power Pm which is the output power of the three-phase AC motor M1, the inter-terminal voltage VH which is the inter-terminal voltage of the smoothing condenser C, and a battery current Ib which is the output current of the battery B.

In FIG. 6, dashed lines associated with the phase characteristics of the inter-terminal voltage VH and the battery current Ib indicate characteristics in a case where the voltage control operation part 113 performs not the PID control but PI control.

As is clear from FIG. 6, if the motor electric power Pm is a white circle p1 illustrated, in the PI control, the inter-terminal voltage VH is influenced by a phase delay of 90 degrees in the smoothing condenser C until the effect of the white circle p1 appears in the inter-terminal voltage VH. Therefore, the effect of the white circle p1 appears in the inter-terminal voltage VH as a white circle p2 illustrated. The battery current Ib determined by feeding back the inter-terminal voltage VH is also influenced by the phase delay in the smoothing condenser C, and it undergoes a transition in a reverse-phase relation with respect to the inter-terminal voltage VH as in a white circle p3 illustrated on the dashed line. As a result, the waveform of the battery current Ib does not match the actual waveform of the motor electric power Pm and cannot suppress a variation in the inter-terminal voltage VH corresponding to a motor electrical frequency. Inevitably, the withstand voltage of each switching element of the inverter 300 and the smoothing condenser C is required extra at least by the variation range of the inter-terminal voltage VH, and thus, an increase in cost and body size is unavoidable.

In contrast, if the PID control is performed instead of the PI control, the phase lead characteristic of the derivative element makes it possible to match the phase of the battery current Ib and the phase of the motor electric power Pm on a time axis. This is indicated by solid lines. For example, for the power point of the illustrated white circle p1 described above, the battery current Ib has a value of a black circle p4 illustrated. As a result, the waveform of the inter-terminal voltage VH ideally does not have the voltage variation corresponding to the motor electrical frequency, as indicated by the solid line.

Incidentally, the motor electrical frequency fmt is a value obtained by multiplying the inverse of the motor rotational speed per second by the number of magnet pole pairs of the three-phase AC motor M1. For example, in the case of a three-phase AC motor having four magnet pole pairs, the motor electrical frequency at 3000 rpm (i.e. 50 revolutions per second) is 50×4=200 (Hz).

<Effect of BPF in Voltage Control Operation Part 113>

Figure 7:
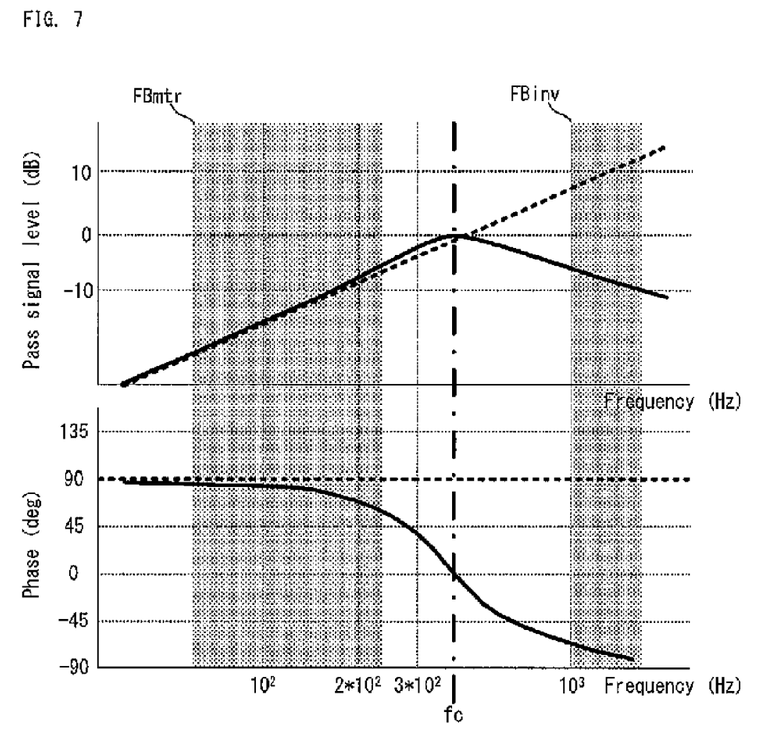
FIG. 7 is a schematic Bode diagram associated with the effect of the control apparatus provided for the motor drive system in FIG. 1.

Next, with reference to FIG. 7, as the effect of the embodiment, the effect of the BPF 113E will be explained. FIG. 7 is a schematic Bode diagram conceptually showing the characteristics of the BPF 113E.

In FIG. 7, the upper portion indicates the frequency characteristic of a pass signal level of the derivative element of the voltage control operation part 113 and the lower portion indicates the frequency characteristic of a phase of the same.

Thick dashed lines indicate the characteristics in a case where a general differentiator is adopted as the derivative element and indicate a comparative example to be used for the comparison with the embodiment.

If the differentiator is used as the derivative element, the phase of a pass signal is advanced by 90 degrees without depending on the frequency of an input signal. Therefore, in terms of the phase, the differentiator is useful as the derivative element. However, as shown in the upper portion, the pass signal level of the differentiator linearly increases on the Bode diagram with respect to the frequency of the input signal. Therefore, if the inter-terminal voltage VH includes a signal with a higher frequency than the motor electrical frequency, the D term of the PID control is significantly influenced by the high-frequency side signal.

Here, the carrier frequency fcar of the carrier Car supplied from the carrier generator 114 describe above is higher than the motor electrical frequency fmt, and the switching frequency of each of the switching elements which constitute the inverter 300 roughly belongs to a high frequency area of several k to several ten kHz. Therefore, if the differentiator is used as the derivative element, the differentiator follows the voltage variation corresponding to the switching frequency of the inverter 300 rather than the voltage variation. Thus, not only that the voltage variation corresponding to the motor electrical frequency cannot be effectively suppressed, but also the inter-terminal voltage VH of the smoothing condenser C likely becomes unstable.

In contrast, what are indicated by illustrated thick solid lines are the frequency characteristics in a case where the BPF 113E is used as the derivative element.

If the BPF 113E is used, the pass signal level almost matches a pass signal level in the case of the differentiator on a lower frequency side than a cutoff frequency fc indicated by an illustrated alternate long and short dash line, and the pass signal level attenuates due to a bandpass effect on a higher frequency side than the cutoff frequency fc. On the other hand, in view of the phase of the pass signal, the phase lead characteristic which almost matches a phase lead characteristic in the case of the differentiator is seen on the lower frequency side than the cutoff frequency fc. In particular, as the frequency decreases, a phase lead amount gradually approaches 90 degrees. In other words, in a frequency band on the lower frequency side than the cutoff frequency fc, the BPF 113E has substantially equivalent efficacy to that of the differentiator. In addition, due to the signal attenuation effect on the higher frequency side than the cutoff frequency fc, as opposed to the differentiator, the derivative element does not act on the voltage variation corresponding to the switching frequency of the inverter 300. Thus, it is possible to suppress the voltage variation corresponding to the motor electrical frequency, selectively and certainly.

Incidentally, the phase lead amount of the pass signal is zero at the cutoff frequency fc, and the pass signal is delayed from the input signal on the higher frequency side than the cutoff frequency fc. However, if the frequency band that can be adopted by the motor electrical frequency fmt is set as an illustrated band FBmtr (refer to a hatching area) and if the frequency band that can be adopted by the switching frequency of the inverter 300 is set as an illustrated band FBinv (refer to a hatching area), there is a great difference between the bands. As long as the cutoff frequency fc is accurately set, an area in which the phase lead amount decreases and a subsequent area in which the phase delays do not significantly overlap the band FBmtr. Moreover, the accurate setting of the cutoff frequency fc is at least not difficult in view of the difference between the bands.

In particular, in the embodiment, the cutoff frequency fc of the BPF 113E is located between the bands on the Bode diagram (on the higher frequency side than the upper limit of a range that can be adopted realistically by the motor electrical frequency fmt, and on the lower frequency side than the lower limit (simply, the carrier frequency fcar) of a range that can be adopted realistically by the switching frequency of the inverter 300). Thus, in the band FBmtr, the voltage variation corresponding to the motor electrical frequency in the smoothing condenser C can be suppressed generally well. Of course, an aspect of setting the cutoff frequency fc has a relatively large acceptable range. For example, it may be set on the higher frequency side than the illustrated cutoff frequency fc so as to ensure a phase lead amount of (90−α) degrees (α is arbitrary, e.g. about 10 degrees) in the illustrated band FBmtr corresponding to the motor electrical frequency. On the other hand, it may be set on the lower frequency side than the illustrated cutoff frequency fc so as to certainly attenuate the signal (e.g. to ensure an attenuation amount of −10 dB) in the illustrated band FBinv corresponding to the switching frequency of the inverter 300.

<Details of Mode Switching Control Process>

Figure 8:
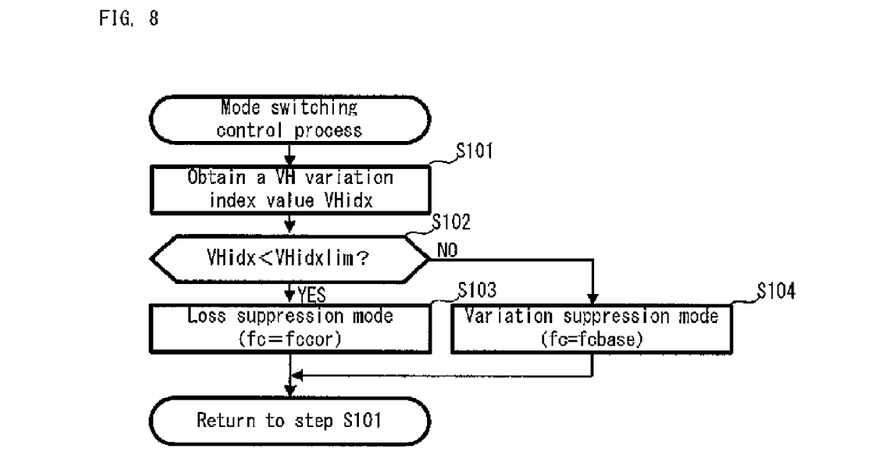
FIG. 8 is a flowchart showing a mode switching control process performed by the control apparatus in the motor drive system in FIG. 1.

Now, with reference to FIG. 8, an explanation will be given on a mode switching control process performed by the ECU 100. FIG. 8 is a flowchart of the mode switching control process.

In FIG. 8, the control apparatus 100 obtains a VH variation index value VHidx (step S101). Here, the VH variation index value VHidx in the embodiment is defined as a mean value of differences between maximum values and minimum values of the inter-terminal voltage VH of the smoothing condenser C in a past predetermined period. Incidentally, the VH variation index value VHidx is one example of the "variation level of the inter-terminal voltage VH" of the present invention. The VH variation index value VHidx is periodically calculated by the control apparatus 100 on the basis of the output value of each sensor.

The control apparatus 100 judges whether or not the VH variation index value VHidx is less than a reference value VHidxlim (step S102). The reference value VHidxlim is determined in accordance with the withstand voltage provided for the smoothing condenser C in the design phase in advance. More specifically, it is a value for defying the upper limit of an area in which it is not necessary to take a measure to suppress the voltage variation corresponding to the motor electrical frequency by the BPF 113E described above.

If the VH variation index value VHidx is greater than or equal to the reference value VHidxlim (the step S102: NO), the control apparatus 100 judges that it is necessary to take an active measure to suppress the voltage variation by the action of the BPF 113E and selects a variation suppression mode (step S104). The variation suppression mode is an operation mode in which the cutoff frequency fc of the BPF 113E is maintained at a reference value fcbase (not necessarily a fixed value) and the PID controlled variable is calculated in accordance with the reference value fcbase.

On the other hand, if the VH variation index value VHidx is less than the reference value VHidxlim (the step S102: YES), the control apparatus 100 judges that it is not necessary to take the active measure to suppress the voltage variation by the action of the BPF 113E and selects a loss suppression mode (step S103). The loss suppression mode is an operation mode in which the cutoff frequency fc of the BPF 113E is reduced and corrected to a frequency fccor on the lower frequency side than the reference value fcbase and the PID controlled variable is calculated in accordance with the reduced and corrected cutoff frequency fccor. If either of the operation modes is selected, the process is returned to the step S101. The mode switching control process is performed as described above.

Figure 9:
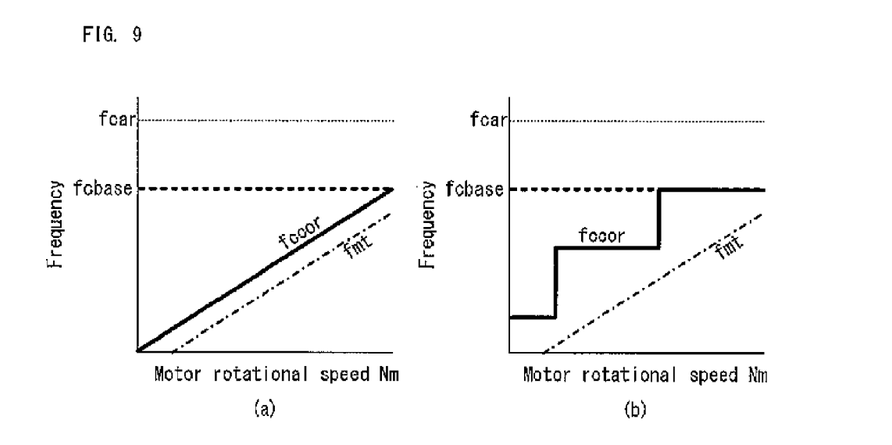
FIG. 9 are views exemplifying aspects of correcting a cutoff frequency fc in the process in FIG. 8.

Now, with reference to FIG. 9, an explanation will be given on the correction value fccor of the cutoff frequency fc in the power loss suppression mode. FIG. 9 are views exemplifying aspects of correcting the cutoff frequency fc.

In FIG. 9, FIG. 9(a) shows a correction aspect in which the cutoff frequency fc of the BPF 113E is reduced and corrected linearly to a motor rotational speed Nm. In other words, according to this correction aspect, the correction value fccor of the cutoff frequency fc changes linearly to the motor rotational speed Nm in a form of offsetting the motor electrical frequency fmt, as indicated by an illustrated solid line.

If the linear correction is possible as describe above, from the viewpoint of ensuring the phase lead characteristic which can minimally ensure a voltage variation suppression effect by the BPF 113E, the correction value fccor of the cutoff frequency is desirably about two to four times the motor electrical frequency fmt.

On the other hand, FIG. 9(b) is a view showing a correction aspect in which the motor rotational speed Nm is divided into a plurality of areas (here, three areas which are a low revolution area, a middle revolution area and a high revolution area) and the cutoff frequency on the lower frequency side than the reference value fcbase is assigned as fccor in each revolution area. In other words, according to this correction aspect, the correction value fccor of the cutoff frequency fc is a stepped value which increases in a stepwise manner as the motor rotational speed Nm increases, as indicated by an illustrated solid line. Therefore, in comparison with the correction aspect in FIG. 9(a), since it is unnecessary to linearly change the cutoff frequency fc, its load is light by that.

In accordance with whichever correction aspect, the cutoff frequency fc of the BPF 113E is corrected to the reduction side with respect to the reference value fcbase (refer to thick dashed lines). As a result, excessive response to the voltage variation corresponding to the motor electrical frequency is suppressed, and current pulsation caused by carrying the electric current from the DC power supply B becomes slower than a case where the cutoff frequency fc is the reference value fcbase. Therefore, loss caused constantly in the course of the current pulsation is reduced, whereby the stored electric power of the DC power supply B can be effectively used. The effective use as described above has an effect of suppressing a reduction in fuel efficiency of a vehicle if the motor drive system 10 is installed in the vehicle, and it is extremely useful in practice.

<Second Embodiment>

Figure 10:
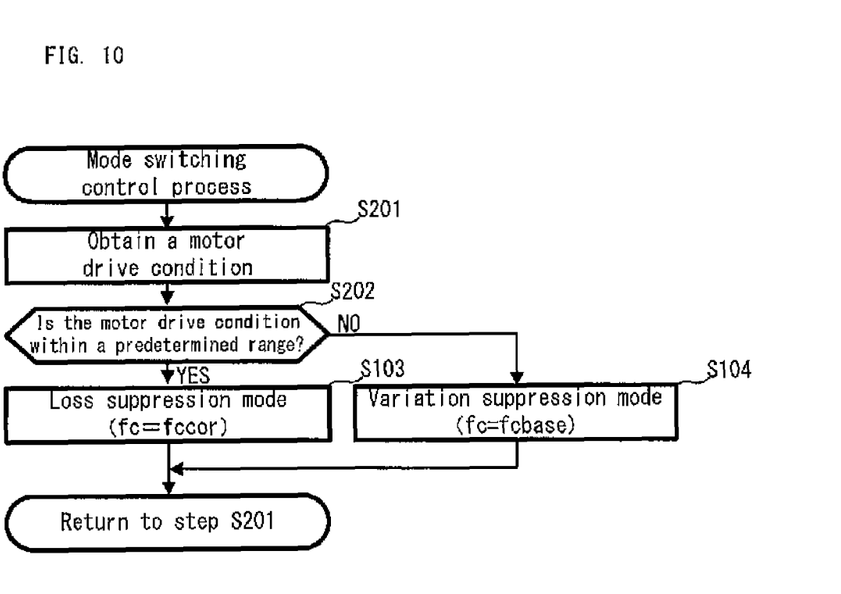
FIG. 10 is a flowchart showing a mode switching control process in a second embodiment of the present invention.

Next, with reference to FIG. 10, an explanation will be given on a mode switching control process in a second embodiment of the present invention. FIG. 10 is a flowchart showing the mode switching control process in the second embodiment. Incidentally, in FIG. 10, portions overlapping those of FIG. 8 will carry the same reference numerals, and the explanation thereof will be omitted as occasion demands. Incidentally, the system configuration in the second embodiment is assumed to be equivalent to that of the motor drive system 10 in the first embodiment.

In FIG. 10, the control apparatus 100 obtains a drive condition of the three-phase AC motor M1 (step S201). Incidentally, the drive condition herein is assumed to be a motor torque Tm and the motor rotational speed Nm.

If obtaining the drive condition of the three-phase AC motor M1, the control apparatus 100 judges whether or not the motor drive condition is within a predetermined range (step S202). If the motor drive condition is out of the predetermined range (the step S202: NO), the process is transferred to the step S104 and the aforementioned variation suppression mode is performed. On the other hand, if the motor drive condition is within the predetermined range (the step S202: YES), the process is transferred to the step S103 and the aforementioned loss suppression mode is performed. The mode switching control process in the second embodiment is performed as described above.

Figure 11:
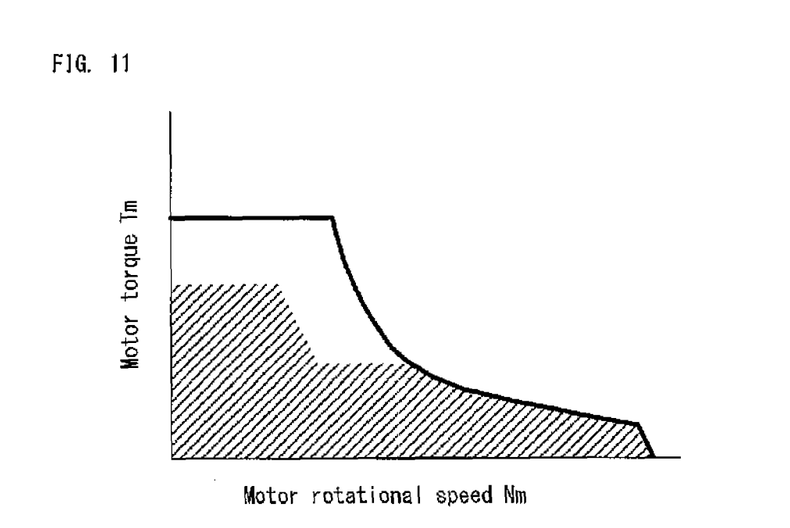
FIG. 11 is a schematic diagram showing a map for motor drive condition judgment in the process in FIG. 10.

Now, with reference to FIG. 11, an explanation will be given on a relation between the motor drive condition and the predetermined range in the step S202. FIG. 11 is a schematic diagram showing a map for motor drive condition judgment.

In FIG. 11, the vertical axis indicates the motor torque Tm, and the horizontal axis indicates the motor rotational speed Nm. In other words, FIG. 11 is a type of operating point map for the three-phase AC motor M1. Here, an illustrated solid line is an operating limit line for the three-phase AC motor M1, and it indicates that the upper limit of the motor torque Tm decreases in the high revolution area.

In FIG. 11, an illustrated hatching area indicates an area in which the voltage variation corresponding to the motor electrical frequency is sufficiently included in the range of the withstand voltage of the smoothing condenser C (the withstand voltage in which a remarkable increasing measure is not taken in reducing the capacity due to the efficacy of the BPF 113E) even though the active measure to suppress the voltage variation by the BPF 113E is not taken. Such an area expands to the high torque side as the motor rotational speed Nm transfers to the low revolution side, and it is determined experimentally, experientially, or theoretically in advance. The "predetermined range" in the step S202 of the mode switching control process in FIG. 10 means this hatching area, and it is stored in a ROM in such a condition that the range exemplified in FIG. 11 is quantified in advance.

As described above, according to the second embodiment, it is possible to judge whether or not the loss suppression mode can be selected, relatively easily, on the basis of the drive condition of the three-phase AC motor M1. Moreover, particularly considering that the reference value of the motor torque Tm (the upper limit of the hatching area) tends to be higher on the lower revolution side, it is possible to select the loss suppression mode as widely as possible. Therefore, it is possible to suppress the voltage variation corresponding to the motor electrical frequency while suppressing the power loss as much as possible.

The present invention is not limited to the aforementioned embodiments, but various changes may be made, if desired, without departing from the essence or spirit of the invention which can be read from the claims and the entire specification. An apparatus for controlling a boost converter, which involves such changes, is also intended to be within the technical scope of the present invention.

Industrial Applicability

The present invention can be applied to control a boost converter in the drive control of an alternating current motor.

Description Of Reference Codes 10 motor drive system
100 control apparatus
110 boost converter controller
113 voltage control operation part
113E BPF (bandpass filter)
120 inverter controller
200 boost converter
300 inverter
C smoothing condenser
B direct current power supply
M1 three-phase alternating current motor

The invention claimed is:

1. An apparatus for controlling a boost converter in a motor drive system, said drive system comprising:
   a direct current power supply;
   a three-phase alternating current motor;
   an electric power converter disposed between the direct current power supply and the three-phase alternating current motor, the electric power converter including switching circuits, each of which corresponds to respective one of three phases of the three-phase alternating current motor, and a smoothing condenser, which is disposed electrically in parallel with the switching circuits; and
   the boost converter disposed between the electric power converter and the direct current power supply, the boost converter boosting a direct current voltage of the direct current power supply and supplying it to the electric power converter,
   said apparatus for controlling the boost converter comprising:
   an operating device comprising a proportional element, an integral element and a derivative element, the derivative element being configured as a bandpass filter, said operating device calculating a PID controlled variable corresponding to an electric current command value of the boost converter for maintaining an output voltage of the boost converter at a command value of an inter-terminal voltage VH of the smoothing condenser;
   a controlling device for controlling the output voltage of the boost converter on the basis of the calculated PID controlled variable;
   a judging device for judging whether or not suppress of loss associated with input/output of an electric power on the direct current power supply is to be prioritized over suppression of variation in the inter-terminal voltage VH; and
   a switching device for switching an operation mode when said operating device calculates the PID controlled value from a variation suppression mode in which a cutoff frequency of the bandpass filter is maintained at a reference value to a loss suppression mode in which the cutoff frequency is corrected to a reduction side with respect to the reference value if it is judged that the loss suppression is to be prioritized,
   in the loss suppression mode, the cutoff frequency being corrected to a lower frequency side at a lower rotational speed of the three-phase alternating current motor.

2. The apparatus for controlling the boost converter according to claim 1, wherein the boost converter includes:
   a reactor whose one end is connected to a positive electrode of the direct current power supply;
   a first switching element connected between the other end of the reactor and the electric power converter;
   a second switching element connected between the other end of the reactor and a negative electrode of the direct current power supply; and
   first and second diodes connected to the first and second switching elements in inverse parallel, respectively.

3. The apparatus for controlling the boost converter according to claim 1, wherein said judging device judges whether or not the loss suppression is to be prioritized on the basis of a variation level of the inter-terminal voltage VH.

4. The apparatus for controlling the boost converter according to claim 1, wherein said judging device judges whether or not the loss suppression is to be prioritized on the basis of a drive condition of the three-phase alternating current motor.

5. The apparatus for controlling the boost converter according to claim 4, wherein said judging device judges that the loss suppression is to be prioritized if a torque value of the three-phase alternating current motor is less than a reference value which changes to be low and high in accordance with a high and low rotational speed of the three-phase alternating current motor, respectively.

* * * * *